United States Patent [19]  [11] Patent Number: 4,698,203
Ehlers et al.  [45] Date of Patent: Oct. 6, 1987

[54] GAS-COOLED NUCLEAR REACTOR WITH A BED OF SPHERICAL FUEL ELEMENTS

[75] Inventors: Claus Ehlers, Viernheim; Josef Schoening, Hambruecken, both of Fed. Rep. of Germany

[73] Assignee: Hochtemperatur-Reaktorbau GmbH, Cologne, Fed. Rep. of Germany

[21] Appl. No.: 659,877

[22] Filed: Oct. 15, 1984

Related U.S. Application Data

[63] Continuation of Ser. No. 326,364, Dec. 1, 1981, abandoned.

[30] Foreign Application Priority Data

Dec. 19, 1980 [DE] Fed. Rep. of Germany ....... 3047959

[51] Int. Cl.$^4$ .............................................. G21C 15/00
[52] U.S. Cl. ..................... 376/343; 376/381; 376/911; 376/406; 376/327; 376/338
[58] Field of Search ................. 376/381–383, 376/385, 406, 343, 355, 351, 298–299, 337–338, 265–266, 294–295, 911, 327

[56] References Cited

U.S. PATENT DOCUMENTS

| 2,812,303 | 11/1957 | Daniels | 376/381 X |
| 2,946,732 | 7/1960 | Wootton | 376/389 X |
| 2,975,117 | 3/1961 | Zinn | 376/351 X |
| 3,070,530 | 12/1962 | Metcalf | 376/381 |
| 3,100,187 | 8/1963 | Fraas | 376/458 |
| 3,123,532 | 3/1964 | Michel | 376/381 X |
| 3,244,597 | 4/1966 | Tower | 376/381 X |
| 3,287,910 | 11/1966 | Silverstein | 376/381 X |
| 3,321,376 | 5/1967 | Machnig et al. | 376/381 |
| 3,344,035 | 9/1967 | Buki | 376/381 |
| 3,402,102 | 9/1968 | Kagi | 376/406 X |
| 3,413,194 | 11/1968 | Kagi | 376/385 |
| 3,442,759 | 5/1969 | Molle et al. | 376/406 X |
| 3,475,272 | 10/1969 | Fortescue et al. | 376/406 X |
| 3,580,807 | 5/1971 | Kumpf | 376/406 |
| 3,996,099 | 12/1976 | Faugeras et al. | 376/335 X |
| 4,110,158 | 8/1978 | Maly et al. | 376/381 |
| 4,139,414 | 2/1979 | Giuggio et al. | 376/337 |
| 4,148,685 | 4/1979 | Brandes | 376/226 |
| 4,201,745 | 5/1980 | Zickgraf | 376/294 X |
| 4,227,968 | 10/1980 | Bodmann | 376/294 |
| 4,243,487 | 1/1981 | Schweiger | 376/298 |

FOREIGN PATENT DOCUMENTS

| 0167674 | 12/1954 | Australia | 376/226 |
| 1514501 | 10/1970 | Fed. Rep. of Germany . | |
| 2216848 | 12/1972 | Fed. Rep. of Germany . | |
| 1025859 | 4/1966 | United Kingdom . | |

Primary Examiner—Deborah L. Kyle
Assistant Examiner—Daniel Wasil
Attorney, Agent, or Firm—Robert J. Koch

[57] ABSTRACT

Gas-cooled nuclear reactors include circulation systems for cooling gas to remove the heat generated in the reactor core. An improved arrangement includes a plurality of steam generators in a horizontal plane located above the horizontal plane of the reactor core. The cooling gas circulates from the bottom of the reactor core to the top. Improved heat removal is accomplished in this manner as the heated cooling gas enters the steam generators after passage through the reactor core without undergoing further circulation in a horizontal or inverse vertical direction.

16 Claims, 4 Drawing Figures

GAS-COOLED NUCLEAR REACTOR WITH A BED OF SPHERICAL FUEL ELEMENTS

This application is a continuation of application Ser. No. 326,364, filed Dec. 1, 1981, now abandoned.

BACKGROUND OF THE INVENTION

1. Field of the Invention

The invention relates to a gas-cooled nuclear reactor having a bed of spherical fuel elements, a cavity located in a pressure vessel to house the reactor core and a plurality of steam generators. More particularly, the reactor arrangement provides for the reactor core and the steam generators on two different horizontal planes.

2. Background of the Prior Art

Gas-cooled nuclear reactors having a bed of spherical fuel elements in the so-called cavern design, i.e. wherein the reactor core and the steam generators are installed in the cavity of a prestressed concrete pressure vessel are known in the prior art. The arrangement of the components, namely the reactor core and the steam generators relative to each other, may be effected in a different manner in the various types of reactors.

One gas-cooled nuclear reactor having a bed of spherical fuel elements is known, the THTR-300. In this reactor the steam generators are arranged on a pitch circle around the reactor core. This arrangement places the steam generators at approximately the same height as the reactor core. The blowers required for the circulation of the cooling gas are housed in the side wall of the prestressed concrete pressure vessel. The cooling gas flows from top to bottom through the reactor core.

It is also known to arrange the reactor core and the steam generators on two different horizontal planes so that the steam generators are located in the axial direction underneath the reactor core, see for example British Patent Specification No. 1 025 859. The steam generators (six steam generators are provided in the preferred embodiment of the patent) are placed on a circle at equal angular distances from each other around the axis of the pressure vessel. They are accessible from the bottom of the reactor structure only. The blowers, each of which is connected with one of the steam generators, are installed in the side wall of the pressure vessel, directly below the steam generators. Cooling gas flows from top to bottom through the reactor core.

In a further nuclear reactor installation utilizing the cavity design, the steam generator consisting of a plurality of units is again arranged below the reactor core, see for example West German Offenlegungsschrift No. 15 14 501. A blower is provided for each of the generator units. The blowers, each of which is connected with one of the steam generators, are installed in the side wall of the pressure vessel, in this case, over the steam generator. Cooling gas flows from top to bottom through the reactor core.

In another nuclear reactor installation of the cavity design the steam generator consisting of a plurality of units is again arranged below the reactor core. A blower is provided for each of the steam generator units. The blowers installed in the side wall of the pressure vessel are located directly adjacent to the steam generator units. Cooling gas flows in the horizontal direction through the latter, passing through the reactor core from top to bottom and collecting in a central chamber between the steam generator units. The steam generators in this arrangement are not accessible at all from the outside of the reactor.

It is further known to install each blower directly underneath the steam generator associated with it. A gas-cooled nuclear reactor having the several steam generators located in a plane lower than the reactor core is described in West German Offenlegungsschrift No. 22 16 848. In this arrangement, however, the nuclear reactor is not constructed in a cavity type of layout, but rather comprises a separate, vertically extending space for each steam generator together with its blower in the pressure vessel. All of these spaces are communicating with the principal chamber containing the reactor core. The vertical spaces are distributed uniformly around the axis of the pressure vessel and accessible from the bottom side of the pressure vessel.

The state-of-the-art finally includes a nuclear reactor with a bed of spherical fuel elements in a cavity type layout wherein the heat generated in the reactor core is again utilized by means of steam generation. This nuclear reactor, sometimes called an AVR, is, however, equipped with one steam generator only, the latter being arranged over the reactor core. The blowers to circulate the cooling gas flowing through the reactor core from bottom to top are located below the reactor core in this nuclear reactor. This known nuclear reactor with a bed of spherical fuel elements has the disadvantage that no extrapolation to reactor type with higher capacities is possible.

SUMMARY OF THE INVENTION

It is, therefore, an object of the invention to provide a gas-cooled nuclear reactor with a bed of spherical fuel elements of the above-described type that is versatile in application, suitable for extrapolation from smaller to larger forms of embodiment and exhibiting a high degree of safety.

This object is attained in a nuclear reactor having a bed of spherical fuel elements and with a plurality of steam generators according to the invention by installing the steam generators over the reactor core and by flowing the cooling gas through the reactor core from bottom to top.

The distinguishing characteristic of the nuclear reactor according to the invention is to be seen in the fact that not one, but a plurality of steam generators is arranged over the reactor core. Herein, the steam generators are located directly over the reactor core which in combination with the flow of gas from bottom to top provides the advantage that the heated cooling gas coming from the reactor core may be passed directly into the steam generators. Furthermore, by virtue of the direction of flow chosen, the piling of the reactor core may be effected in a simplified manner since the core support installation is exposed to cold cooling gas only, thereby greatly reducing thermal expansions.

As the cooling gas is divided over several steam generators, i.e. a plurality of primary gas loops are available, the failure of one loop does not require the shutdown of the nuclear reactor of the invention, whereby its availability and thus its economy, is greatly enhanced. Its capacity is readily extrapolated to different dimensions by altering the dimensions of the core.

In order to protect the spherical fuel elements against damage or even destruction as the result of overheating, it is desirable not to exceed a certain power density in the reactor core. This increases the safety of the nuclear reactor. The flow of the cooling gas through the reactor core from bottom to top also requires lower power densities in the core. The danger of the overheating of fuel elements is thus eliminated from the beginning. If it is desired to construct a nuclear reactor designed according to the invention with a higher power capacity, this may be effected simply by enlarging the reactor core, in particular, by increasing the core diameter.

Preferably, at least three steam generators are provided in the nuclear reactor according to the invention, since by increasing the number of cooling or heat exchange loops in existehce, the availability of the nuclear reactor is enhanced. The steam generators are arranged on a circle around the axis of the pressure vessel at equal angular distances.

The plurality and the specific arrangement of the steam generators render it possible to remove the afterheat generated in the case of failures without additional auxillary systems from the reactor core.

The afterheat is removed advantageously by means of natural convection, since the latter is acting in the direction of the flow of the cooling gas (with the inclusion of the principal heat sink and assuming a reactor under pressure).

A blower for the cooling gas is assigned to each steam generator with the blowers being installed in the same cavity, again directly over the reactor core. The blowers always follow the steam generators (viewed in the direction of flow of the cooling gas). All of the components are readily accessible from the top.

In order to maintain the structural height of the pressure vessel as low as possible, the steam generators and the blowers are installed advantageously in a manner adjacent to each other. One blower and one steam generator together are constituting a unit and are interconnected by a conduit. Such a unit may be closed to the flow of the cooling gas during the operation of the nuclear reactor and may be replaced when necessary by another unit.

The weight of the steam generators and the blowers is supported by a common load bearing roof inserted in the reactor cavity.

In order to obtain a flow of the cooling as uniform as possible prior to its entry into the steam generators, a hot gas collector chamber is located above the reactor core. This chamber communicates with the steam generators.

The bed of fuel elements comprises a plurality of fuel elements preferably having an annular configuration, i.e. the fuel elements are piled into an annular space (hence the bed is sometimes referred to as a pile or the reactor pile). In a reactor core of this type, different power capacities may be realized, first by broadening or narrowing the annular space and secondly, by shifting inwardly or outwardly the center line of said space while maintaining a constant width, i.e. at a varying distance from the center axis of the core.

Such an annular pile of fuel elements is bounded by a side reflector consisting of an external reflector and an annular internal reflector. The latter may include a free inner space.

Advantageously, this free inner space is utilized for instrumentation, the execution of repeat tests and for maintenance and inspection work.

Preferably, the annular space for the bed of fuel elements is dimensioned so that the control, regulation and shutdown of the nuclear reactor may be effected solely by the insertion of absorber rods through the side reflector.

In the case of a solid core, i.e., a fuel element pile of the conventional type, the diameter of the pile is severely restricted if the control, regulation and shutdown of the nuclear reactor is to be effected solely with "reflector rods". With an annular pile of fuel elements, because of the greater effectivity of the reflector rods, such a restriction exists to a limited extent only. The decisive role herein is played by the width of the annular space for the pile of fuel elements.

Preferably, the absorber rods are introduced from the bottom into the two parts of the side reflector, as sufficient space is available.

In addition to the openings provided in the side reflector for the insertion of the absorber rods, openings for a second shutdown system may be provided therein. This second shutdown system may include, for example, the introduction of boron spheres. In this case, the openings in the side reflector are accessible from the top and devices are mounted on the openings whereby the boron spheres may be inserted in the side reflector by gravity only.

The annular space for the pile of fuel elements may be equipped with several sphere discharge shafts, whereby the burned fuel elements may be removed downward from the reactor core. The introduction of fuel elements may be effected from the top by means of gas pressure transport lines. Nuclear reactors according to the invention with an annular pile of fuel elements may be operated both with a single or the multiple passage of fuel elements.

The annular space for the pile of fuel elements is closed off on top by a roof reflector which conveniently is self-supporting and is resting directly on the side reflector.

The hot gas collector chamber is advantageously bound by the roof reflector and the roofing bricks placed upon the roof reflector. To allow the passage of the hot cooling gas to the steam generators, the roof reflector is provided with a series of passage orifices for the cooling gas.

The roofing bricks are arranged so that they are closing off the hot gas collector chamber laterally and in the upward direction. In order to obtain good thermal insulation of the parts of the installation located above the roofing bricks against the hot gas collector chamber, the thickness of the top closing wall of the roof bricks is several times that of the lateral walls.

The pressure vessel housing the reactor core and the steam generators together with the blowers may be made of prestressed concrete. However, an alternate embodiment of grey cast iron parts is also feasible.

Advantageously, an installation chute is provided in the center of the roof of the pressure vessel, capable of serving as the principal installation and removal chute for the reactor components located in the cavity. The installation and removal of these components may thus be effected in a simple manner.

Preferably, the nuclear reactor according to the invention is designed with a power capacity of 100 to 200 MWe. There exists a broad field of applications for reactors of this size, for example, in chemistry. As described herein above, nuclear reactors with a higher capacity may be constructed easily by altering the dimensions of the core.

In addition to this possibility of extrapolation to different power capacities affording versatile applications of the nuclear reactor according to the invention, the useful range of the nuclear reactor may be further extended by arranging several reactor units, each consisting of a reactor core and several steam generators in a common pressure vessel.

It is also possible, however, to combine a plurality of nuclear reactors constructed according to the invention in to a composite reactor according to a modular building block arrangement.

BRIEF DESCRIPTION OF THE DRAWING

In the drawing, an embodiment of the nuclear reactor with a bed of spherical fuel elements is represented schematically.

DETAILED DESCRIPTION OF THE PREFERRED EMBODIMENT

Figure 1:
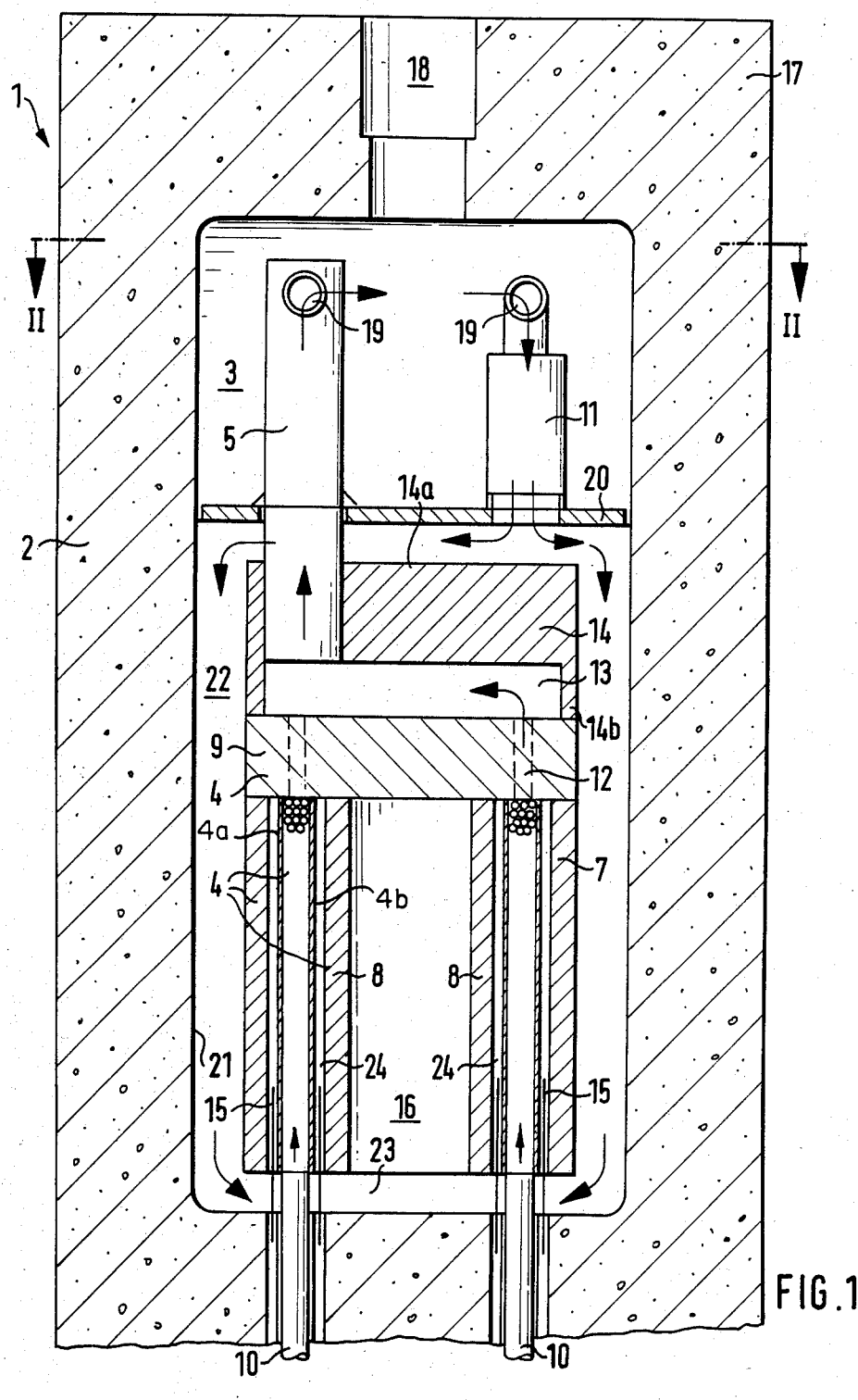
FIG. 1 represents a nuclear reactor in a section on the line 1—1 of FIG. 2.

The nuclear reactor 1 with a bed of spherical fuel elements consists essentially of a cylindrical prestressed concrete pressure vessel 2 with a cavity 3, a reactor core 4 and four steam generators 5. The reactor core 4 and the steam generators 5 are installed in the cavity 3 with the latter being located over the reactor core, arranged at equal angular distances on a circle. The reactor core 4 includes concentric annular reactor core walls 4a and 4b for retaining a bed of spherical fuel elements, the bed having an annular configuration, a roof reflector 9 and a side reflector consisting of an external reflector 7 and an internal reflector 8. The fuel elements are inserted by means of charging devices (not illustrated) from the top. For the removal of the fuel elements, the annular space is equipped with several discharge shafts 10.

Figure 2:
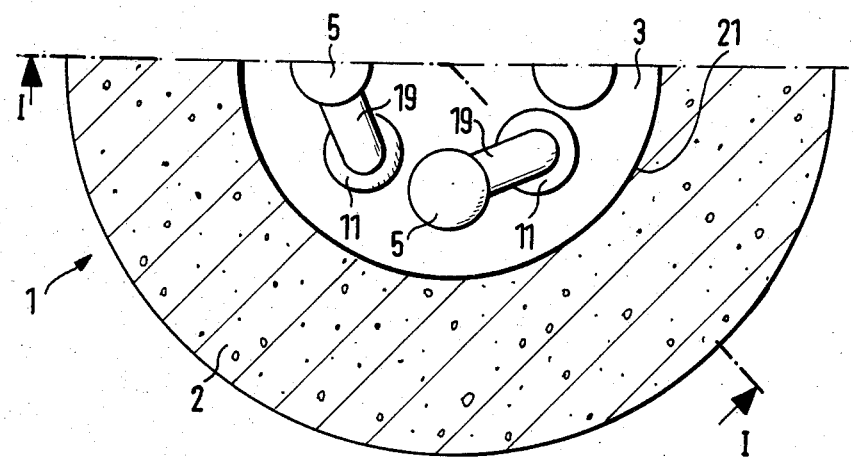
FIG. 2 shows a cross section through the nuclear reactor on the line 11—11 of FIG. 1.

A blower 11 is assigned to each steam generator 5 for the cooling medium. The blower is located adjacent to the steam generator involved and forms a unit with the latter. Both parts of the unit are interconnected by means of a conduit 19 (see FIG. 2). A hot gas collector chamber 13 (see FIG. 1) is located above the roof reflector 9 to collect the hot cooling gas, the collector chamber communicating with the annular space for the pile 6 of the spherical fuel elements through the cooling gas passages 12 in the roof reflector 9. In the upward direction and laterally, the hot gas collector space 13 is bounded by the roofing bricks 14 forming an upper closing wall 14a and a lateral closing wall 14b. The thickness of the upper closing wall 14a is several times that of the lateral closing wall 14b. The roofing bricks 14 are resting on the roof reflector which in turn lines on the parts 7, 8 of the side reflector.

The steam generators 5 and the blowers 11 are supported on a load bearing roof 20 installed in the cavity 3. The blowers 11 pass only through the roof 20, while the steam generators 5 are extended through the roof 20 and also penetrate through the upper closing wall 14a. They are thus in direct communication with the hot gas collector chamber 13.

Both the internal reflector 8 and the external reflector 7 are provided with openings 24, through which absorber rods 15 may be introduced from below for the control, regulation and shutdown of the reactor. The absorber rods 15 shall, therefore, be designated hereinafter as reflector rods. Additionally to the openings 24 for the absorber rods 15, the side reflector parts 7 and 8 may contain openings for a second shutdown system. To the extent that this system consists of additional absorber rods, the openings are designed in a manner similar to that of the openings 24 for the first system. It is also possible, however, to use boron spheres as the second shutdown system. Boron spheres are introduced from the top through suitably arranged openings. The spheres may be inserted in the openings by gravity.

The internal reflector 8 again has an annular configuration and defines a free inner space 16, whereby various measuring instruments may be introduced into the reactor. The inner space 16 may further be used for potential repeat tests. The prestressed concrete pressure vessel 2 has in its roof 17 an installation shaft 18 whereby individual reactor components may be introduced into the cavity 3 or removed therefrom. The internal wall of the prestressed concrete pressure vessel is clad with a liner 21 forming a gas tight inner skin.

Cooling gas flows through the pile of fuel elements 6 from bottom to top. The heated cooling gas then passes through the cooling gas passage openings 12 into the hot gas collector space 13 from where it enters the steam generators 5. The cooled gas flows through the lines 19 to the blowers 11 and is pressured by them into the space 22 between the reactor core 4 and the liner 21. The gas then travels to the cold gas collector chamber 23 under the reactor core and enters from there the pile 6 of the fuel elements wherein it is reheated.

Figure 3:
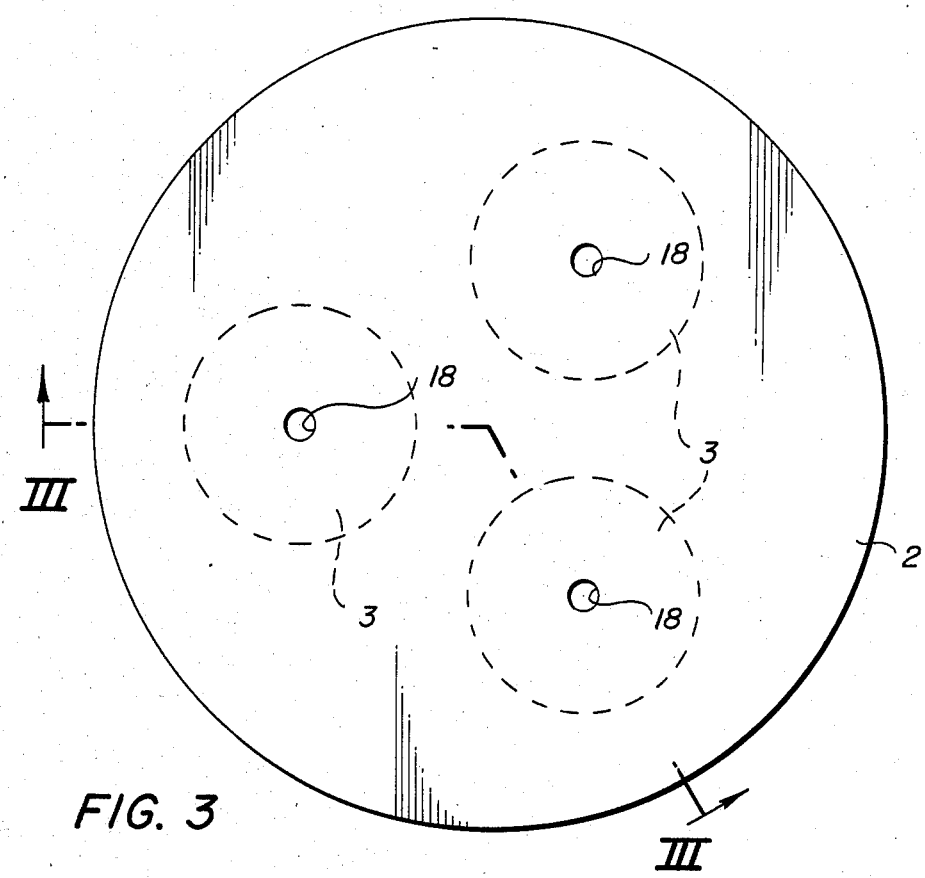
FIG. 3 illustrates a top view of a nuclear reactor wherein the placement of a plurality of reactor cones within the concrete vessel is shown.
Figure 4:
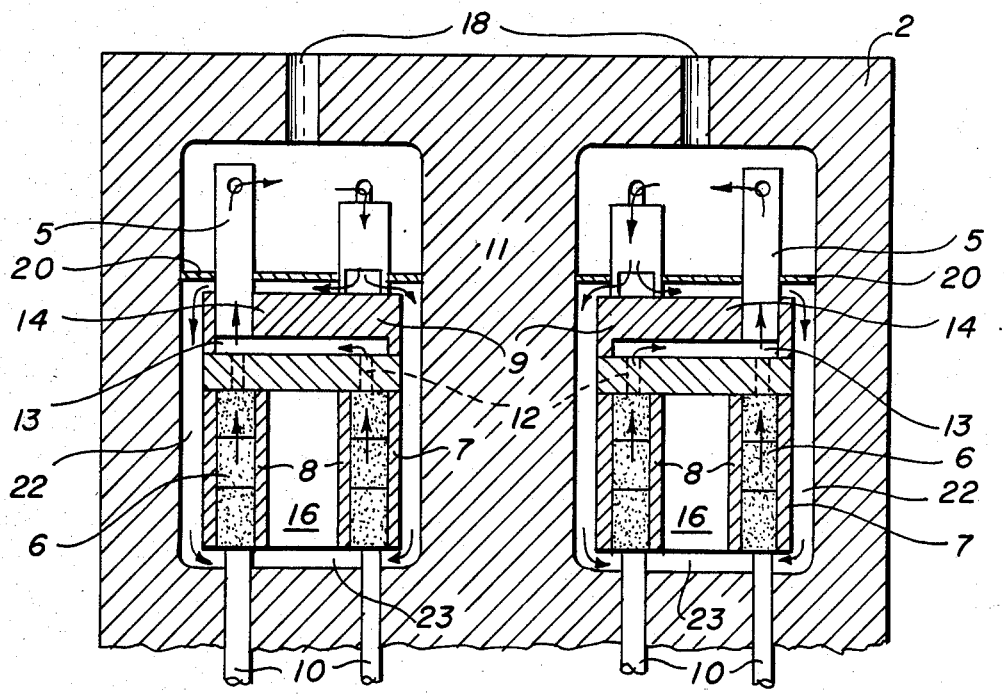
FIG. 4 shows a cross section of the reactor along with the line III—III of FIG. 3.

In FIG. 3, the placement of a plurality of reactor cores 3 are illustrated by the phantom lines. The inlet shaft 18 is illustrated as penetrating to the outside of the concrete pressure vessel 2. With three reactor cores in the reactor vessel according to FIG. 2, each core is equipped with the complete features of the nuclear reactor of FIG. 1. The cross sectional view of FIG. 4 illustrates two of the three reactor cores in the common reactor vessel.

What is claimed is:

1. A gas-cooled nuclear reactor comprising:
    a pressure vessel;
    a reactor core arranged on a first horizontal plane in said pressure vessel, said reactor core having concentric annular walls arranged to form an annular space for retaining a plurality of spherical fuel elements in said annular space in said reactor core;
    a plurality of steam generators arranged on a second horizontal plane in said pressure vessel above said reactor core;
    a plurality of blowers inside said pressure vessel arranged in combination with a coolant path for circulation directing of cooling gas from the bottom of the reactor core through said annular space to the top of the reactor, each of said blowers and said steam generators arranged next to one another above said reactor core; and
    a hot gas collector chamber above said reactor core, said chamber being in communiction with said steam generators.

2. The gas-cooled nuclear reactor of claim 1 comprising at least three steam generators, said steam generators being arranged at equal angular distances on a circle around the axis of said pressure vessel.

3. The gas-cooled nuclear reactor of claim 1 wherein each blower communicates with a steam generator by way of a conduit thereby forming a unit.

4. The gas-cooled nuclear reactor of claim 3 wherein said steam generators and blowers are attached to a common load bearing roof.

5. The gas-cooled nuclear reactor of claim 1 wherein said annular space is bounded by a side reflector member comprising an external reflector and a similarly annular internal reflector, said annular internal reflector defining a free inner space.

6. The gas-cooled nuclear reactor of claim 5 wherein said free inner space is dimensioned so as to be usable for instrumentation, the execution of repeat tests and for maintenance and inspection work.

7. The gas-cooled nuclear reactor of claim 5 further comprising means for the control, regulating and shutdown of the reactor, said means including a plurality of rods insertable in said side reflector member wherein said absorber rods are introduced from below the core into said side reflector member.

8. The gas-cooled nuclear reactor of claim 7 further comprising a conduit in said side reflector member for the introduction of boron spheres as an auxiliary system.

9. The gas-cooled nuclear reactor of claim 1 wherein said annular space for the pile of spherical fuel elements comprises a plurality of fuel element discharge shafts.

10. The gas-cooled nuclear reactor of claim 5 wherein said annular space for the pile of fuel elements is bounded on top by a roof reflector member, said roof reflector resting on said side reflector member.

11. The gas-cooled nuclear reactor of claim 10 further comprising roofing bricks placed on the roof reflector and a plurality of cooling gas passages in the roof reflector.

12. The gas-cooled nuclear reactor of claim 11 wherein said roofing bricks close off the hot gas collector space in the upper and lateral direction, the thickness of the upper closing wall being several times that of the lateral closing wall.

13. The gas-cooled nuclear reactor of claim 1 wherein said pressure vessel is a prestressed concrete pressure vessel.

14. The gas-cooled nuclear reactor of claim 1 wherein said reactor has a power capacity of 100 to 200 MWe.

15. The gas-cooled nuclear reactor of claim 1 further comprising a plurality of reactor units, each comprising a reactor core and a plurality of steam generators arranged in a common pressure vessel.

16. The gas-cooled nuclear reactor of claim 15 wherein a plurality of reactor units are combined in modular units to form a composite reactor.

* * * * *